(12) United States Patent
Naito et al.

(10) Patent No.: US 7,842,103 B2
(45) Date of Patent: Nov. 30, 2010

(54) METHOD FOR MANUFACTURING SOLID ELECTROLYTIC CAPACITOR DEVICE

(75) Inventors: Kazumi Naito, Chiba (JP); Shoji Yabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 304 days.

(21) Appl. No.: 11/994,357

(22) PCT Filed: Jun. 30, 2006

(86) PCT No.: PCT/JP2006/313090

§ 371 (c)(1),
(2), (4) Date: Dec. 31, 2007

(87) PCT Pub. No.: WO2007/004556

PCT Pub. Date: Jan. 11, 2007

(65) Prior Publication Data

US 2009/0225497 A1     Sep. 10, 2009

(30) Foreign Application Priority Data

Jun. 30, 2005   (JP) .............................. 2005-191229

(51) Int. Cl.
    *H01G 9/00* (2006.01)
(52) U.S. Cl. .................................................... 29/25.03
(58) Field of Classification Search ................ 29/25.03; 361/524
    See application file for complete search history.

(56) References Cited

U.S. PATENT DOCUMENTS 5,183,543 A * 2/1993 Toyosawa et al. ........... 204/242

6,430,026 B1   8/2002 Nagato et al.

FOREIGN PATENT DOCUMENTS

| JP | 02-299213 A | 12/1990 |
| JP | 03-139816 A | 6/1991 |
| JP | 2001-332450 A | 11/2001 |
| JP | 2001-332453 A | 11/2001 |
| JP | 2003-068572 A | 3/2003 |

OTHER PUBLICATIONS

Machine translation of JP 2003-068572.*
Machine translation of JP 2001-332453.*

* cited by examiner

Primary Examiner—Scott B Geyer
Assistant Examiner—Seahvosh J Nikmanesh
(74) Attorney, Agent, or Firm—Sughrue Mion, PLLC

(57) ABSTRACT

The present invention relates to a production method of a solid electrolytic capacitor element wherein a semiconductor layer is formed by electrolytic polymerization on an oxide dielectric film formed on the surface of an electric conductor and an electrode layer is laminated thereon, comprising passing current providing a period for temporarily applying a reverse voltage during the electrolytic polymerization passing current using an electric conductor having a dielectric layer formed thereon as an anode and a negative electrode plate placed in the electrolyte as a cathode; a solid electrolytic capacitor element produced by the method; a solid electrolytic capacitor obtained from the solid electrolytic capacitor element and use thereof. According to the present invention, a solid electrolytic capacitor element in which a high quality semiconductor layer is formed in a short time can be produced, which enables to produce a solid electrolytic capacitor having a good ESR property.

15 Claims, No Drawings

METHOD FOR MANUFACTURING SOLID ELECTROLYTIC CAPACITOR DEVICE

TECHNICAL FIELD

The present invention relates to a production method of a solid electrolytic capacitor element wherein a semiconductor layer is provided efficiently by electrolytic polymerization on a dielectric layer formed on the surface of an electric conductor. More specifically, the present invention relates to a production method of a solid electrolytic capacitor element which enables to obtain a solid electrolytic capacitor having a sufficient capacity even when the time for forming a semiconductor layer is shortened, by switching the cathode and the anode temporarily before or during the electrolytic polymerization step to form a semiconductor layer by passing an electric current using an electric conductor as an anode and a negative electrode plate placed in the electrolyte as a cathode; a solid electrolytic capacitor element and a solid electrolytic capacitor obtained by the method and the use thereof.

BACKGROUND ART

As for a capacitor having high capacitance used in various electronic devices, a solid electrolytic capacitor is known wherein an oxide dielectric film layer, a semiconductor layer and an electrode layer are formed sequentially on an electric conductor and sealed with resin mold jacketing.

A solid electrolytic capacitor is produced by sealing a solid electrolytic capacitor element in which an aluminum foil having fine pores in the surface layer or a tantalum powder sintered body having fine pores in the inside is used as one electrode (electric conductor) and which comprises a dielectric layer formed on the surface layer of the electrode, the other electrode (usually a semiconductor layer) provided on the dielectric layer, and an electrode layer stacked on the other electrode. In comparison among capacitors using electric conductors having the same volume, the smaller the size of the fine pores of the electric conductor and the larger the number of the pores, the larger the surface area of the electric conductor inside and the larger the capacitance of the capacitor produced from the electric conductor can be.

Recently a solid electrolytic capacitor is required to have low ESR (equivalent series resistance) and therefore an electrically conducting polymer is used in preference as an inside semiconductor layer. Such a semiconductor layer is formed by chemical polymerization or electrolytic polymerization.

Electrolytic polymerization is generally conducted using an electric conductor on the surface of which a dielectric layer is formed as an anode and a negative electrode plate placed in an electrolytic solution as a cathode with direct current, but a method using alternate current at the time of electrolytic polymerization has also been reported (JP-A-H02-299213: Patent Document 1). However, according to this method, a large amount of polymer is also formed on a cathode, which may lead to short circuit.

Patent Document 1: JP-A-H02-299213

DISCLOSURE OF THE INVENTION

Problems to be Solved by the Invention

An objective of the present invention is to provide a production method of a solid electrolytic capacitor element, which enables to produce a solid electrolytic capacitor having a good ESR property, wherein a high quality semiconductor layer is provided in a short time on the oxide dielectric film layer formed on the surface of an electric conductor by electrolytic polymerization using the electric conductor as an anode.

Means to Solve the Problems

The present inventors have found that when electrolytic polymerization is conducted by passing direct current using an electric conductor on the surface of which a dielectric layer is formed as an anode and a negative electrode plate placed in the electrolytic solution as a cathode including switching the cathode and the anode temporarily before or during the electrolytic polymerization step to apply a reverse voltage, it enables to obtain a solid electrolytic capacitor having a sufficient capacity even when the time for forming a semiconductor layer is short, to shorten the production time and to improve yield. The present invention has been achieved based on this finding.

That is, the present invention relates to the following production method of a solid electrolytic capacitor element, a solid electrolytic capacitor produced by the method and use thereof.

1. A production method of a solid electrolytic capacitor element wherein a semiconductor layer is formed by electrolytic polymerization on an electric conductor having an oxide dielectric film layer, and an electrode layer is sequentially stacked thereon, comprising passing current providing a period for temporarily applying a reverse voltage in the electrolytic polymerization by passing current using an electric conductor as an anode and a negative electrode plate placed in the electrolytic solution as a cathode.

2. The production method of a solid electrolytic capacitor element as described in 1 above, comprising applying a reverse voltage before the electrolytic polymerization step or during the electrolytic polymerization step.

3. The production method of a solid electrolytic capacitor element as described in 1 or 2 above, wherein the period for applying a reverse voltage is 10% or less of the total time of passing current.

4. The production method of a solid electrolytic capacitor element as described in any one of 1 to 3 above, wherein the reverse voltage is 1 V or less.

5. The production method of a solid electrolytic capacitor element as described in any one of 1 to 4 above, comprising repeating of a step for forming a semiconductor layer and a step of re-chemical formation several times.

6. The production method of a solid electrolytic capacitor element as described in 5 above, comprising a step without applying a reverse voltage among the steps for forming a semiconductor layer which step is repeated several times.

7. The method for producing a solid electrolytic capacitor element as described in any one of 1 to 6 above, wherein the electric conductor is a metal or alloy mainly comprising at least one member selected from a group consisting of tantalum, niobium, titanium and aluminum; a niobium oxide; or a mixture of at least two of the members selected from these metals, alloy and niobium oxide.

8. The method for producing a solid electrolytic capacitor element as described in any one of 1 to 7 above, wherein the electric conductor is a sintered body to which an anode lead is connected.

9. The method for producing a solid electrolytic capacitor element as described in 8 above, wherein the material of the anode lead is tantalum, aluminum, niobium, titanium or alloy mainly comprising these valve-acting metals.

10. The method for producing a solid electrolytic capacitor element as described in 8 or 9 above, wherein the anode lead is in the form of a wire, foil or plate.

11. The method for producing a solid electrolytic capacitor element as described in any one of 1 to 10 above, wherein the semiconductor layer is at least one member selected from organic semiconductor layers.

12. The method for producing a solid electrolytic capacitor element as described in 11 above, wherein the semiconductor layer is at least one member selected from an organic semiconductor comprising benzopyrroline tetramer and chloranil, an organic semiconductor mainly comprising tetrathiotetracene, an organic semiconductor mainly comprising tetracyanoquinodimethane, and organic semiconductors mainly comprising an electrically conducting polymer obtained by doping a dopant in a polymer containing a repeating unit represented by the following formula (1) or (2):

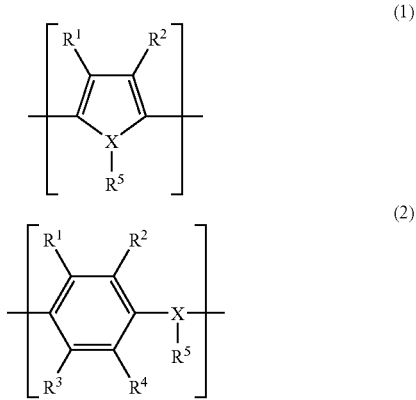

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each pair of $R^1$ with $R^2$ and $R^3$ with $R^4$ may combine to form a cyclic structure.

13. The method for producing a solid electrolytic capacitor element as described in 12 above, wherein the electrically conducting polymer containing a repeating unit represented by formula (1) is an electrically conducting polymer containing, as a repeating unit, a structural unit represented by the following formula (3):

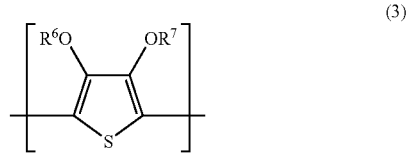

wherein $R^6$ and $R^7$ each independently represents a hydrogen atom, a linear or branched, saturated or unsaturated alkyl group having from 1 to 6 carbon atoms, or a substituent forming at least one or more 5-, 6-or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

14. The method for producing a solid electrolytic capacitor element as described in 12 above, wherein the electrically conducting polymer is selected from a group consisting of polyaniline, polyoxyphenylene, polyphenylene sulfide, polythiophene, polyfuran, polypyrrole, polymethylpyrrole, and a substitution derivative and a copolymer thereof.

15. The method for producing a solid electrolytic capacitor element as described in 13 or 14 above, wherein the electrically conducting polymer is poly(3,4-ethylene-dioxythiophene).

16. The method for producing a solid electrolytic capacitor element as described in 11 above, wherein the electric conductivity of the semiconductor is from $10^{-2}$ to $10^3$ S/cm.

17. A solid electrolytic capacitor element obtained by the production method described in any one of 1 to 16 above.

18. A solid electrolytic capacitor obtained by sealing the solid electrolytic capacitor element described in 17 above with resin mold jacketing.

19. An electronic circuit using the solid electrolytic capacitor described in 18 above.

20. An electronic device using the solid electrolytic capacitor described in 18 above.

Effects of the Invention

The present invention enables to shorten the time for forming a semiconductor layer of a solid electrolytic capacitor element, which leads to shortening the time of the entire production steps and improving the yield. For example, if the production comprises the step of forming a semiconductor layer for 60 minutes eight times, it is impossible to conduct three cycles of production in one day (24 hours) taking the operating time between the steps into consideration. However, according to the present invention, an equivalent semiconductor layer can be formed through the steps for 60 minutes six times, which enables to conduct three cycles of production in one day (24 hours) and improve the production efficiency.

BEST MODE FOR CARRYING OUT THE INVENTION

An embodiment of the production method of the solid electrolytic capacitor element and the solid electrolytic capacitor of the present invention is described hereinafter.

The solid electrolytic capacitor element of the present invention is produced by forming an oxide dielectric film layer, a semiconductor layer and an electrode layer sequentially on a sintered body of electric conductor powder comprising, for example, valve-acting metal.

The sintered body to be used in the present invention can be produced by sintering the molded product of electric conductor powder. The surface area of the sintered body can be increased by appropriately selecting the molding pressure (for example, 0.1 to 50 kg/mm$^2$) and sintering conditions (for example, a temperature from 800 to 1,800° C. and a time period from one minute to ten hours). To further increase the surface area of the sintered body after sintering, the surface of the sintered body may be chemically and/or electrically etched.

The sintered body is not particularly limited in its shape and generally column-shaped. In a case of a rectangular column, at least one of the corners may be chamfered or rounded spherically to obtain a good average of the leakage current (LC) values of the solid electrolytic capacitors produced using the sintered body. Also, the shape of the sintered body may be tapered so as to make it easier to remove the molded product from the mold. In this case, the shape of the produced sintered body becomes almost like a frustum of pyramid.

Examples of the electric conductor for use in the present invention include tantalum, aluminum, niobium, and titanium; alloy mainly comprising these valve-acting metals; a niobium oxide; and a mixture of at least two members selected from these valve-acting metals, alloy and electrically conducting oxide.

In the case of using a metal as the electric conductor, valve-acting metals, the above-mentioned alloy or electrically conducting oxide, or the above-mentioned sintered body may be used after subjecting a part thereof to at least one treatment selected from carbonization, phosphation, boronation, nitridation and sulfidation.

An outgoing lead may be connected directly to the electric conductor but in a case where the electric conductor is configured by shaping or shaping followed by sintering the powder of the electric conductor, it is also possible to mold a part of a separately prepared outgoing lead together with the powder at the shaping and use the outgoing lead outside the shaped portion as an outgoing lead for one electrode of the solid electrolytic capacitor.

The anode lead may be in either shape of a wire, foil or plate. Also, the anode lead may not be embedded in the molded product but connected thereto after the molded product is made into a sintered body. As for the material of the anode lead, tantalum, aluminum, niobium, titanium or alloy mainly comprising these valve-acting metals are used. Furthermore, the anode lead may be used after subjecting a part thereof to at least one treatment selected from carbonization, phosphation, boronation, nitridation and sulfidation.

In a case where the anode lead is embedded in a molded product, it is preferable to embed the anode to the depth of one-third or more, more preferably, two-third or more inside of the sintered body to maintain the strength of the sintered body so as to endure the thermal or physical encapsulation stress imposed on the capacitor element, which is generated at the encapsulation described later.

In order to prevent the semiconductor layer described later from adhering to the upper portion of the anode lead and leading to short circuit of a capacitor, at the boundary between the sintered body and the anode lead (on the anode lead side), an insulating resin may be attached like a belt. Or, an insulating plate wired through the anode lead may be provided at the base of the sintered body.

In the present invention, an oxide dielectric film layer is formed on the sintered body surface and on a part of the anode lead. Examples of the oxide dielectric film layer include a dielectric layer mainly comprising at least one member selected from metal oxides such as $Ta_2O_5$, $Al_2O_3$, $TiO_2$ and $Nb_2O_5$. The dielectric layer can be obtained by subjecting the above-mentioned anode body to chemical formation in an electrolytic solution. The dielectric layer may be a mixture of a dielectric layer mainly comprising at least one member selected from metal oxides and a dielectric layer used in a ceramic capacitor (International publication WO00/75943 (U.S. Pat. No. 6,430,026)).

Typical examples of the semiconductor layer formed on the dielectric layer in the present invention include at least one compound selected from organic semiconductors.

Specific examples of the organic semiconductors include an organic semiconductor mainly comprising an electrically conducting polymer obtained by doping a dopant in a polymer containing a repeating unit represented by the following formula (1) or (2):

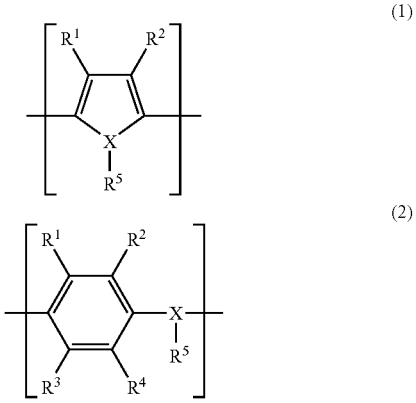

In formulae (1) and (2), $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each pair of $R^1$ with $R^2$ and $R^3$ with $R^4$ may combine to form a cyclic structure.

In the present invention, the electrically conducting polymer containing a repeating unit represented by formula (1) is preferably an electrically conducting polymer containing, as a repeating unit, a structural unit represented by the following formula (3):

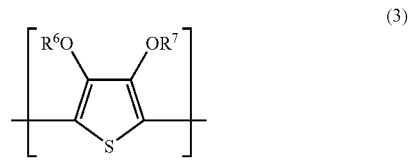

In the formula, $R^6$ and $R^7$ each independently represents a hydrogen atom, a linear or branched, saturated or unsaturated alkyl group having from 1 to 6 carbon atoms, or a substituent forming at least one 5-, 6-or 7-membered saturated hydrocarbon cyclic structure containing two oxygen atoms when the alkyl groups are combined with each other at an arbitrary position. The cyclic structure includes a structure having a vinylene bond which may be substituted, and a phenylene structure which may be substituted.

The electrically conducting polymer containing such a chemical structure is being electrically charged and a dopant is doped therein. The dopant is not particularly limited and a known dopant can be used.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and a substitution derivative and a copolymer thereof. Among these, preferred are polypyrrole, polythiophene and a substitution derivative thereof (e.g., poly(3,4-ethylenedioxythiophene)).

When the organic semiconductor used has an electric conductivity of $10^{-2}$ to $10^3$ S/cm, the solid electrolytic capacitor produced can have a small ESR value and this is preferred.

In the present invention, the semiconductor layer is formed by immersing an electric conductor on the surface of which a dielectric layer is formed in an electrolytic solution and conducting electrolytic polymerization with DC power source using the electric conductor as an anode and a negative electrode plate placed in the electrolytic solution as a cathode. The present invention is characterized by passing current while providing a period for temporarily applying a reverse voltage (reverse energization) before or during the electrolytic polymerization. Subsequently, in order to repair fine defects of the dielectric layer generated during the formation of the semiconductor layer, re-chemical formation is to be performed. Moreover, the operation of forming a semiconductor layer and then performing re-chemical formation is to be repeated multiple times.

That is, a semiconductor layer is formed by repeating multiple times the following steps:

the step comprising formation of a semiconductor layer on the dielectric layer by immersing a sintered body of valve-acting metal having an oxide dielectric film to which an anode lead is connected in an electrolytic solution containing monomer for forming a semiconductor and a dopant and by passing current through the sintered body; followed by pulling up the sintered body from the solution and washing and drying the sintered body; and the step comprising re-chemical formation by immersing the sintered body in the re-chemical formation solution containing electrolyte (such as mineral acid, organic acid and salts thereof) and by passing current; followed by pulling up the sintered body from the solution and washing and drying the sintered body.

In the present invention, a reverse voltage is applied temporarily before or during the electrolytic polymerization step. This enables to shorten the time for forming a semiconductor and to improve the yield of the products and production efficiency. For example, when a step of 60-minute polymerization comprising applying first a reverse voltage of 0.5 V for five minutes and then a positive voltage for 55 minutes is repeated six times, the total polymerization time becomes 360 minutes. Meanwhile, when a step of polymerization by applying a positive voltage only for 60 minutes and a step of pulling up the electric conductor and subjecting it to re-chemical formation are repeated eight times as in a conventional case, the total polymerization takes 480 minutes. As a result, the present invention enables to conduct six cycles of a 60-minute polymerization step three times a day (within 24 hours).

In the present invention, temporarily applying a reverse voltage means to pass current (i.e., to apply a reverse voltage) using the negative electrode plate as an anode and the electric conductor as a cathode for a determined time before or during the step of passing current using the electric conductor as an anode and the negative electrode plate placed in the electrolytic solution as a cathode with DC power source.

The period for applying a reverse voltage is 10% or less, preferably 5% or less, specifically preferably 2% or less of the total time of passing current. For example, if the total time of passing current is 60 minutes, the time for applying a reverse voltage is preferably 6 minutes or less, specifically preferably 3 minutes or less. It is ineffective to extend the time for applying a reverse voltage to more than 10% of the total time of passing current. That is, it rather requires prolonging the time for applying a positive voltage in order to form an equivalent amount of a semiconductor layer.

In the present invention, the reverse voltage applied before or during the electrolytic polymerization is preferably 1 V or less. When the reverse voltage exceeds 1 V, there may be a case where a semiconductor layer is formed on the negative electrode plate, and if the layer flakes and becomes suspended in the electrolytic solution, an operation to remove the flakes is needed.

Among the repeated steps of electrolytic polymerization and re-chemical formation, some steps may be performed by passing a positive voltage only without passing a reverse voltage. That means, all that required is to make the ratio of the time for passing a reverse voltage to the total time energization time within the above-mentioned preferable range.

In the present invention, an electrode layer is provided on the semiconductor layer formed by the above-mentioned method or the like. The electrode layer can be formed, for example, by solidification of an electrically conducting paste, plating, metal deposition or lamination of a heat-resistant electrically conducting resin film. Preferred examples of the electrically conducting paste include silver paste, copper paste, aluminum paste, carbon paste and nickel paste. One of these may be used or two or more thereof may be used. In the case of using two or more pastes, these pastes may be mixed or stacked as separate layers. The electrically conducting paste applied is then left standing in air or heated and thereby solidified. The thickness of the electrically conducting paste layer after solidified is generally about 0.1 μm to about 200 μm per layer.

The electrically conducting paste usually contains electrically conducting powder in an amount of 40 to 97 mass %. If the electrically conducting powder content is less than 40 mass %, the electric conductivity of the produced electrically conducting paste disadvantageously becomes low, whereas if the content exceeds 97 mass %, the electrically conducting paste may undergo adhesion failure. In the electrically conducting paste, the above-described electrically conducting polymer for forming the semiconductor layer or powder of metal oxide may be mixed and used.

Examples of the plating include nickel plating, copper plating, silver plating, gold plating and aluminum plating. Examples of the metal to be deposited include aluminum, nickel, copper, silver and gold.

More specifically, the electrode layer is formed by sequentially stacking, for example, a carbon paste and a silver paste on the semiconductor layer formed on an electric conductor.

By stacking layers up to the electrode layer on the electric conductor in this way to form a cathode part, a solid electrolytic capacitor element is produced.

The solid electrolytic capacitor element of the present invention having such a constitution is jacketed, for example, by resin mold, resin case, metallic jacket case, resin dipping or laminate film, whereby a solid electrolytic capacitor product for various uses can be completed. Among these, a chip capacitor jacketed by resin mold is most preferred, in that reduction in the size and cost can be easily achieved.

With respect to the resin used for resin mold jacketing, a known resin used for encapsulation of a capacitor, such as epoxy resin, phenol resin and alkyd resin can be employed. In all of these resins, when a low-stress resin generally available on the market is used, the encapsulation stress imposed on the capacitor element, which is generated at the encapsulation, can be mitigated and this is preferred. For the resin sealing, a transfer machine is used with preference.

The thus-produced capacitor may be subjected to an aging treatment so as to repair the thermal and/or physical deterioration of the dielectric layer, which is caused at the formation of electrode layer or at the jacketing. The aging treatment is performed by applying a predetermined voltage (usually, within twice the rated voltage) to the capacitor. The optimal values of aging time and temperature vary depending on the type and capacitance of the capacitor and the rated voltage and therefore, these are previously determined by performing an experiment. The aging time is usually from several minutes to several days and the aging temperature is usually 300° C. or less by taking account of thermal deterioration of the voltage-applying jig. The aging atmosphere may be air or a gas such as argon, nitrogen and helium. Also, the aging may be performed in any one condition of reduced pressure, atmospheric pressure and applied pressure. When aging is performed while water vapor is supplied or after water vapor was supplied, it may help to further stabilize the dielectric layer in some cases. One example of the method for supplying the water vapor is a method of supplying water vapor from a water reservoir placed in the aging furnace by heat.

The method of applying a voltage can be designed to pass an arbitrary current such as direct current, alternating current having an arbitrary waveform, alternating current superposed on direct current, and pulse current. It is also possible to once stop applying a voltage on the way of aging and again apply a voltage.

The solid electrolytic capacitor produced by the method of the present invention can be preferably used, for example, for a circuit requiring a capacitor having a high capacity and a low ESR value, such as a central processing circuit and a power source circuit. These circuits can be used in various digital devices such as a personal computer, server, camera, game machine, DVD equipment, AV equipment and cellular phone, and electronic devices such as various power sources. The capacitor produced in the present invention has a high capacitance and a low ESR value and therefore, electronic circuits or electronic devices with a good performance can be obtained by using the capacitor.

EXAMPLES

The present invention is described in greater detail below by specifically referring to Examples, but the present invention is not limited to these Examples.

Example 1

Using a tantalum powder having CV (product of capacitance and chemical formation voltage) of 150,000 µF·V/g, a sintered body in a size of 4.5×1.0×3.0 mm (density of sintered body: 6.0 g/cm$^3$) was produced at a sintering temperature of 1,320° C. for a sintering time of 20 minutes, wherein a tantalum (Ta) lead wire (0.40 mmφ) was partially embedded in parallel to the longitudinal direction of the sintered body and the lead wire part (anode part) protruded from the sintered body was provided. The sintered body to serve as an anode excluding a part of the lead wire was dipped in a 2 mass % toluenesulfonic acid aqueous solution and subjected to chemical formation at 65° C. for 400 minutes by applying 9 V between the anode and a tantalum (Ta) plate electrode serving as a cathode to form an oxide dielectric film layer comprising $Ta_2O_5$. An operation of subjecting this sintered body excluding the lead wire alternately to dipping in a tank containing a 20 mass % sodium molybdate aqueous solution and drying and to dipping in a tank containing a 10 mass % sodium borohydride aqueous solution and drying, and performing re-chemical formation at 65° C. with 8 V for 15 minutes in a 2 mass % toluenesulfonic acid aqueous solution was repeated ten times.

Subsequently, the sintered body was dipped in a tank (the tank was laminated with a tantalum foil and serving itself as an external electrode) containing a mixed solution of 20 mass % ethylene glycol and water, which contains 5 mass % toluenesulfonic acid and supersaturated pyrrole, and by assigning the anode to the lead wire of the sintered body and the cathode to the external electrode, an electric current was applied at a reverse voltage of 0.5 V at 2° C. for one minute and then an electric current of 120 µA was passed at a positive voltage for 49 minutes to form a semiconductor layer on the dielectric layer. The sintered body was pulled out, washed with water, washed with alcohol for five minutes, dried, subjected to re-chemical formation in a 1 mass % naphthalenesulfonic acid aqueous solution at 65° C. with 7 V for 15 minutes, then pulled out, washed with water, washed with alcohol for five minutes, and dried. This process of forming a semiconductor layer and performing re-chemical formation was repeated six times to form a semiconductor layer comprising polypyrrole with a main dopant of toluenesulfonic acid ion. On this semiconductor layer, a carbon paste was stacked and dried, and then a silver paste layer was stacked and dried to form an electrode layer. In this way, 30 units of capacitor elements were produced. On two end parts of a pair of separately prepared lead frames serving as an external electrode, the lead wire on the sintered body side and the silver paste surface on the electrode layer side were placed and electrically or mechanically connected by spot-welding for the former and by a silver paste for the latter. Thereafter, the entirety excluding a part of the lead flame was transfer-molded with epoxy resin. After curing the resin at 155° C. for 60 minutes, the lead frame outside the mold was cut at a predetermined position and then bent along the jacket to serve as an external terminal. In this way, a chip capacitor in a size of 7.3×4.3×1.8 mm was produced. Subsequently, the capacitor was aged at 125° C. with 4 V for four hours, and thereby 30 units of chip capacitors were eventually produced.

Example 2

Chip capacitors were produced in the same way as in Example 1 except that the semiconductor layer was formed by passing current of 120 µA at a positive voltage for 20 minutes, applying a reverse voltage of 0.5 V for one minute and passing current of 120 µA at a positive voltage for 29 minutes.

Example 3

Chip capacitors were produced in the same way as in Example 1 except that the semiconductor layer was formed by passing current of 120 µA at a positive voltage for 20 minutes, applying a reverse voltage of 0.5 V for one minute and passing current of 120 µA was passed at a positive voltage for 29 minutes and in the second and the fifth steps among the step of forming a semiconductor layer and performing re-chemical formation repeated six times, a semiconductor layer was formed by passing current at a positive voltage only.

Comparative Example 1

Chip capacitors were produced in the same way as in Example 1 except that the semiconductor layer was formed by passing current of 120 µA at a positive voltage for 50 minutes.

Comparative Example 2

Chip capacitors were produced in the same way as in Example 1 except that the semiconductor layer was formed by passing current of 120 µA at a positive voltage for 50 minutes and repeating the step of forming a semiconductor layer and performing re-chemical formation eight times.

Example 4

A niobium primary powder (average particle diameter: 0.30 μm) ground by utilizing hydrogen embrittlement of a niobium ingot was granulated to obtain a niobium powder having an average particle diameter of 115 μm (this niobium powder was fine powder and therefore, naturally oxidized on the surface to contain 110,000 ppm of oxygen). The obtained niobium powder was left standing in a nitrogen atmosphere at 450° C. and further in argon at 700° C. to obtain a partially nitrided niobium powder (CV: 295,000 μF·V/g) having a nitrided amount of 8,500 ppm. The resulting niobium powder was molded together with a niobium wire of 0.40 mm in diameter and the molded article was sintered at 1,250° C. to prepare 30 units of sintered bodies (electrically conducting bodies) having a size of 4.5×3.0×1.7 mm (mass of each sintered body: 0.084 g; the niobium wire serving as a lead wire was present such that 3.7 mm was inside the sintered body and 10 mm was outside). Thereafter, the sintered body was chemically formed in a 1 mass % anthraquinonesulfonic acid aqueous solution at 80° C. with 20 V for 7 hours to form a dielectric layer mainly comprising diniobium pentoxide on the sintered body surface and on a part of the lead wire. Subsequently, the operation of dipping the sintered body in a 30 mass % iron toluenesulfonate aqueous solution, drying it to remove the moisture and then performing re-chemical formation in a 30 mass % toluenesulfonic acid aqueous solution at 80° C. with 15 V for 15 minutes was alternately repeated eight times. Furthermore, the sintered body was dipped in a bath (the bath was laminated with a tantalum foil to serve as an external electrode) containing a mixed solution of water and 30 mass % ethylene glycol, in which 3,4-ethylene dioxythiophene and 1 mass % anthraquinonesulfonic acid were dissolved. By using the lead wire of the sintered body as an anode and an external electrode as a cathode, a semiconductor layer was formed on the dielectric layer by applying a reverse voltage of 0.9 V for three minutes and passing current of 90 μA at a positive voltage for 57 minutes at 23° C. The sintered body was pulled up from the aqueous solution, washed with water, washed with alcohol for 15 minutes, dried and then subjected to re-chemical formation in a 1 mass % anthraquinonesulfonic acid aqueous solution at 80° C. with 14 V for 15 minutes. This operation of performing electrolytic polymerization and then re-chemical formation was repeated eight times, whereby a semiconductor layer comprising polythiophene derivative with a main dopant of anthraquinone sulfonic acid ion was formed on the dielectric layer.

On this semiconductor layer, a carbon paste layer was stacked and dried, and then a silver paste was stacked and dried to form an electrode layer. In this way, a plurality of solid electrolytic capacitor elements were produced. On two end parts of a pair of separately prepared lead frames serving as an external electrode, the lead wire on the sintered body side and the silver paste surface on the electrode layer side were placed and electrically or mechanically connected by spot-welding for the former and by a silver paste for the latter. Thereafter, the entirety excluding a part of the lead flame was transfer-molded with epoxy resin. The lead frame outside the mold was cut at a predetermined position and then bent along the jacket to serve as an external terminal. In this way, a chip capacitor in a size of 7.3×4.3×2.8 mm was produced. Subsequently, the capacitor was aged at 125° C. with 7 V for three hours and passed through a tunnel furnace having a peak temperature of 270° C. and a region at 230° C. for 35 seconds three times, and thereby 30 units of chip capacitors were eventually produced.

Example 5

Chip capacitors were produced in the same way as in Example 4 except that the semiconductor layer was formed by passing current of 90 μA at a positive voltage for 10 minutes, applying a reverse voltage of 0.2 V for one minute and passing current of 90 μA at a positive voltage for 49 minutes.

Example 6

Chip capacitors were produced in the same way as in Example 4 except that the semiconductor layer was formed by passing current of 90 μA at a positive voltage for 10 minutes, applying a reverse voltage of 0.2 V for one minute and passing current of 90 μA at a positive voltage for 49 minutes and in the first to forth steps among the step of forming a semiconductor layer and performing re-chemical formation repeated eight times, a semiconductor layer was formed by passing current at a positive voltage only.

Example 7

Chip capacitors were produced in the same way as in Example 4 except that in the first to forth steps among the step of forming a semiconductor layer and performing re-chemical formation repeated eight times, a semiconductor layer was formed by passing current at a positive voltage only.

Example 8

Chip capacitors were produced in the same way as in Example 4 except that the semiconductor layer was formed by applying a reverse voltage of 0.9 V for 3 minute and passing current of 150 μA at a positive voltage for 57 minutes.

Comparative Example 3

Chip capacitors were produced in the same way as in Example 4 except that the semiconductor layer was formed by passing current of 90 μA at a positive voltage for 60 minutes.

Comparative Example 4

Chip capacitors were produced in the same way as in Example 4 except that the semiconductor layer was formed by passing current of 90 μA at a positive voltage for 60 minutes, and by repeating the step of forming a semiconductor layer and performing re-chemical formation ten times.

Example 9

After reducing $Nb_2O_5$ particles having an average particle size of 3 μm with magnesium at 850° C. under vacuum, the particles were left stand at room temperature and magnesium oxide generated as by-product was removed with hydrochloric acid to obtain NbO powder, which is an electrically conducting oxide (having an average particle size of 150 μm as a result of granulation at the time of reduction and CV value of 90,000 μF·V/g). The NbO powder was molded with embedding a tantalum wire of 0.52 mm therein and then sintered at 1,350° C. under vacuum for 40 minutes to produce 30 units of sintered body having a size of 4.0×3.2×1.6 mm (mass of each sintered body: 0.05 g). The sintered body was subjected to chemical formation in a 0.5% benzoic acid aqueous solution at 65° C. with 14 V for 400 minutes to form a dielectric layer comprising $Nb_2O_5$ on the sintered body surface and on a part of the anode lead. Next, the operation of dipping only the sintered body part in a 20% iron naphthalenesulfonate alcohol solution, pulling up the sintered body and drying it at 60° C. for five minutes was repeated seven times. Subsequently, the sintered body was dipped in a mixed solution of water and 30% ethylene glycol, in which 3,4-ethylene dioxythiophene and 3% anthraquinonesulfonic acid were dissolved. By using the lead wire of the sintered body as an anode and a tantalum plate separately provided in the solution as a cathode, electrolytic polymerization was performed by passing current of 50 μA at 25° C. for 30 minutes. The sintered body was pulled up from the bath, washed with water, washed with ethanol and dried. Further, the sintered body was subjected to re-chemical formation in the above chemical formation bath with 9 V at 65° C. for 15 minutes, pulled up from the bath, washed with water and dried. A series of operations of electrolytic polymerization and re-chemical formation was repeated 20 times, and in the first, third, fifth, seventh and ninth cycles among the 20 cycles of the operation, the anode was switched with the cathode after a lapse of ten minutes during each of 30-minute electrolytic polymerization and a reverse voltage of 0.5 V was applied for one minute. After that, through the formation of an electrode layer, encapsulating and post-processing in the same way as in Example 1, 30 units of chip solid electrolytic capacitors in a size of 7.3×4.3×2.8 mm were produced. The capacitance of the produced capacitor was 270 μF.

Comparative Example 5

Solid electrolytic capacitors were produced in the same way as in Example 9 except that a reverse voltage was not applied during the electrolytic polymerization. The capacitance of the produced capacitor was 225 μF.

Test Example

Measurement of the Capacitance of Solid Electrolytic Capacitors

The capacitance of each capacitor produced in the above-mentioned Examples 1 to 8 and Comparative Examples 1 to 4 was measured by the following method:

The capacitance of the capacitor: The capacitance was measured using LCR Meter produced by Hewlett-Packard at 120 Hz and at room temperature. The measurement results (on an average) were shown in Table 1.

TABLE 1

| | Conditions for Electrolytic Polymerization | Number of Repetition | Capacitance of Capacitor (μF) |
|---|---|---|---|
| Example 1 | At a reverse voltage of 0.5 V for 1 minute and at a positive voltage of 120 μA for 49 minutes | 6 | 1010 |
| Example 2 | At a positive voltage of 120 μA for 20 minutes, at a reverse voltage of 0.5 V for 1 minute and at a positive voltage of 120 μA for 29 minutes | 6 | 1020 |
| Example 3 | Same as in Example 2 | 6 in total (at a positive voltage only in the second and fifth time) | 1000 |
| Comp. Example 1 | At a positive voltage of 120 μA for 50 minutes | 6 | 850 |
| Comp. Example 2 | Same as in Comparative Example 1 | 8 | 990 |
| Example 4 | At a reverse voltage of 0.9 V for 3 minutes and at a positive voltage of 90 μA for 57 minutes | 8 | 920 |
| Example 5 | At a positive voltage of 90 μA for 10 minutes, at a reverse voltage of 0.2 V for 1 minute and at a positive voltage of 90 μA for 49 minutes | 8 | 930 |
| Example 6 | Same as in Example 5 | 8 in total (at a positive voltage only in first to fourth times) | 910 |
| Example 7 | Same as in Example 4 | Same as in Example 6 | 910 |
| Example 8 | At a reverse voltage of 0.9 V for 3 minutes and at a positive voltage of 150 μA for 57 minutes | 8 | 890 |
| Example 9 | At a positive voltage of 50 μA for 10 minutes, at a reverse voltage of 0.5 V for 1 minute and at a positive voltage of 50 μA for 19 minutes | 20 in total (at a positive voltage only except the first, third, fifth, seventh and ninth times) | 270 |
| Comp. Example 3 | At a positive voltage of 90 μA for 60 minutes | 8 | 770 |
| Comp. Example 4 | Same as in Comparative Example 3 | 10 | 870 |
| Comp. Example 5 | At a positive voltage of 50 μA for 30 minutes | 20 | 225 |

As in Examples 1 and 2, Examples 4 and 5 and Comparative Examples 1 to 4, it has turned out that a capacitor having a higher capacitance can be obtained in a case where a reverse voltage was temporarily applied before or during the electrolytic polymerization rather than in a case where the electrolytic polymerization was conducted by passing current only at a positive voltage. Also, the comparison of Examples 1 to 2 and Example 3, or Examples 4 to 5 and Examples 6 to 7, respectively, shows that it has an insignificant effect on the capacitance of a capacitor if the electrolytic polymerization is performed by energization only at a positive voltage several times among the repeated operations of forming a semiconductor layer and performing re-chemical formation.

In Comparative Example 4, though the number of repetitions of the step of forming a semiconductor layer and performing re-chemical formation was increased, it was not so effective as in a case where a reverse voltage was applied at the time of forming a semiconductor layer and, what is more, takes longer time. Therefore, it is industrially unsuitable.

The invention claimed is:

1. A production method of a solid electrolytic capacitor element wherein a semiconductor layer is formed by electrolytic polymerization on an electric conductor having an oxide dielectric film layer, and an electrode layer is sequentially stacked thereon, comprising passing current providing a period for temporarily applying a reverse voltage in the electrolytic polymerization by passing current using an electric conductor as an anode and a negative electrode plate placed in the electrolytic solution as a cathode,
wherein the reverse voltage is applied before the electrolytic polymerization step or during the electrolytic polymerization step.

2. The production method of a solid electrolytic capacitor element as claimed in claim 1, wherein the period for applying a reverse voltage is 10% or less of the total time of passing current.

3. The production method of a solid electrolytic capacitor element as claimed in claim 1, wherein the reverse voltage is 1 V or less.

4. The production method of a solid electrolytic capacitor element as claimed in claim 1, comprising repeating of a step for forming a semiconductor layer and a step of re-chemical formation several times.

5. The production method of a solid electrolytic capacitor element as claimed in claim 4, comprising a step without applying a reverse voltage among the steps for forming a semiconductor layer which step is repeated several times.

6. The method for producing a solid electrolytic capacitor element as claimed in claim 1, wherein the electric conductor is a metal or alloy mainly comprising at least one member selected from a group consisting of tantalum, niobium, titanium and aluminum; a niobium oxide; or a mixture of at least two of the members selected from these metals, alloy and niobium oxide.

7. The method for producing a solid electrolytic capacitor element as claimed in claim 1, wherein the electric conductor is a sintered body to which an anode lead is connected.

8. The method for producing a solid electrolytic capacitor element as claimed in claim 7, wherein the material of the anode lead is tantalum, aluminum, niobium, titanium or alloy mainly comprising these valve-acting metals.

9. The method for producing a solid electrolytic capacitor element as claimed in claim 7, wherein the anode lead is in the form of a wire, foil or plate.

10. The method for producing a solid electrolytic capacitor element as claimed in claim 1, wherein the semiconductor layer is at least one member selected from organic semiconductor layers.

11. The method for producing a solid electrolytic capacitor element as claimed in claim 10, wherein the semiconductor layer is at least one member selected from an organic semiconductor comprising benzopyrroline tetramer and chloranil, an organic semiconductor mainly comprising tetrathiotetracene, an organic semiconductor mainly comprising tetracyanoquinodimethane, and organic semiconductors mainly comprising an electrically conducting polymer obtained by doping a dopant in a polymer containing a repeating unit represented by the following formula (1) or (2):

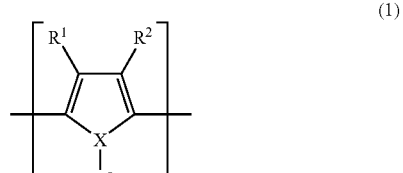

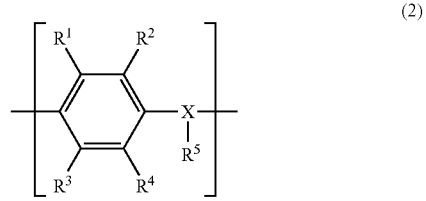

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each pair of $R^1$ with $R^2$ and $R^3$ with $R^4$ may combine to form a cyclic structure.

12. The method for producing a solid electrolytic capacitor element as claimed in claim 11, wherein the electrically conducting polymer containing a repeating unit represented by formula (1) is an electrically conducting polymer containing, as a repeating unit, a structural unit represented by the following formula (3):

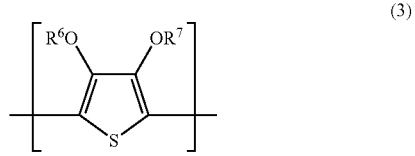

wherein $R^6$ and $R^7$ each independently represents a hydrogen atom, a linear or branched, saturated or unsaturated alkyl group having from 1 to 6 carbon atoms, or a substituent forming at least one or more 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

13. The method for producing a solid electrolytic capacitor element as claimed in claim 12, wherein the electrically conducting polymer is poly(3,4-ethylenedioxythiophene).

14. The method for producing a solid electrolytic capacitor element as claimed in claim 11, wherein the electrically conducting polymer is selected from a group consisting of polyaniline, polyoxyphenylene, polyphenylene sulfide, polythiophene, polyfuran, polypyrrole, polymethylpyrrole, and a substitution derivative and a copolymer thereof.

15. The method for producing a solid electrolytic capacitor element as claimed in claim 10, wherein the electric conductivity of the semiconductor is from $10^{-2}$ to $10^3$ S/cm.

* * * * *